(12) United States Patent
Asakawa et al.

(10) Patent No.: US 8,310,911 B2
(45) Date of Patent: Nov. 13, 2012

(54) OPTICAL PICKUP APPARATUS

(75) Inventors: Chiaki Asakawa, Gunma (JP);
Mitsuhiro Hiruma, Kiryu (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 13/232,665

(22) Filed: Sep. 14, 2011

(65) Prior Publication Data

US 2012/0069725 A1 Mar. 22, 2012

(30) Foreign Application Priority Data

Sep. 14, 2010 (JP) ................................. 2010-205771

(51) Int. Cl.
*G11B 7/00* (2006.01)

(52) U.S. Cl. ............... 369/112.29; 369/112.17; 369/121

(58) Field of Classification Search ........................ None
See application file for complete search history.

(56) References Cited

U.S. PATENT DOCUMENTS

| 7,564,745 B2 * | 7/2009 | Kanaya et al. ............ 369/44.14 |
| 2004/0246876 A1 * | 12/2004 | Kim et al. ............... 369/112.23 |
| 2005/0213471 A1 * | 9/2005 | Taguchi et al. .......... 369/109.02 |
| 2006/0007812 A1 * | 1/2006 | Nishi et al. ............... 369/44.37 |
| 2006/0181977 A1 * | 8/2006 | Heor .......................... 369/44.37 |
| 2006/0285473 A1 * | 12/2006 | Kan ......................... 369/112.16 |
| 2008/0304394 A1 * | 12/2008 | Kikuhara et al. ........ 369/112.16 |
| 2011/0170397 A1 * | 7/2011 | Sato et al. ............... 369/112.16 |

FOREIGN PATENT DOCUMENTS

| JP | 2008-204496 | 9/2008 |
| JP | 2009-032304 | 2/2009 |

* cited by examiner

*Primary Examiner* — Paul Huber

(74) *Attorney, Agent, or Firm* — Morrison & Foerster LLP

(57) ABSTRACT

In an optical pickup apparatus, a major part of an optical path of a laser beam emitted from a first semiconductor laser device and an optical path of a laser beam emitted from a second semiconductor laser device 3 are shared. The first laser beam is transmitted through a quarter wavelength plate and a second reflecting mirror and is reflected by a first reflecting mirror. With this structure, the number of parts of optical systems disposed in the optical pickup apparatus is reduced, an attachment operation of the parts becomes easier, and a time required for adjusting an optical axis is reduced. Thus, an operational efficiency is greatly improved.

5 Claims, 4 Drawing Sheets

|  | The first optical path synthesizing prism(5) | The second optical path synthesizing prism(8) | The reflection mirror(10) |
|---|---|---|---|
| DVD/CD Rs:Ts | — | 90(%):10(%) | 100(%):0(%) |
| Rp:Tp | 0(%):100(%) | 40(%):60(%) | 30(%):70(%) |
| BD Rs:Ts | 100(%):0(%) | 0(%):100(%) | 100(%):0(%) |
| Rp:Tp | 0(%):100(%) | 0(%):100(%) | 100(%):0(%) |

OPTICAL PICKUP APPARATUS

This application claims priority from Japanese Patent Application Number JP 2010-205771 filed on Sep. 14, 2010, the content of which is incorporated herein by reference in its entirety.

BACKGROUND OF THE INVENTION

1. Field of the Invention

The present invention relates to an optical pickup apparatus which performs recording and/or reproduction by using light with multiple kinds of wavelengths.

2. Description of the Related Art

A structure shown in FIGS. 4A and 4B has been known as an embodiment of a conventional optical pickup apparatus. Note that FIG. 4A shows a side view of an optical system of the optical pickup apparatus, while FIG. 4B shows a plan view of the optical system of the optical pickup apparatus.

As shown in the drawings, an optical pickup apparatus 31 includes first and second light sources 32A and 32B configured to emit light beams, and first and second optical systems 34A and 34B configured to guide the emitted light beams to an optical disk 42 and to guide light beams reflected from the optical disk 42 to first and second light-receiving elements (PDIC) 33A and 33B.

Specifically, the first light source 32A emits a light beam for CD and DVD, while the second light source 32B emits a light beam for BD. The light beams respectively emitted from the first and second light sources 32A and 32B respectively travel on optical paths of the first and second optical systems 34A and 34B. The first and second optical systems 34A and 34B include first and second polarization beam splitters 35A and 35B, first and second collimator lenses 36A and 36B, a reflecting mirror 37, first and second quarter wavelength plates 38A and 38B, first and second objective lenses 39A and 39B, first and second HOE (Holographic Optical Element) 40A and 40B, first and second PDIC 33A and 33B, first and second front monitor diodes 41A and 41B, and the like (This technology is described, for instance, in Japanese Patent Application Publication No. 2009-32304, on pages 7 to 9 and FIGS. 1 and 2).

Moreover, for an optical pickup apparatus supporting various kinds of optical disks such as BD, DVD, and CD, a structure is known in which an optical path for BD and an optical path for DVD and CD are guided to a shared optical path. Specifically, reflecting mirrors are respectively disposed directly under an objective lens for BD and an objective lens for DVD and CD. Each of light beams corresponding to these kinds of optical disks is guided on the shared optical path and is reflected by the reflecting mirror to enter the objective lens for BD or the objective lens for DVD and CD (This technology is described, for instance, in Japanese Patent Application Publication No. 2008-204496, on Pages 7 to 9 and FIGS. 1 and 2).

As described above, in the conventional optical pickup apparatus 31, the light beam emitted from the first light source 32A passes through the optical path of the first optical system 34A and enters the optical disk 42. The light beam reflected by the optical disk 42 similarly passes through the optical path of the first optical system 34A and enters the first PDIC 33A. On the other hand, the light beam emitted from the second light source 32B passes through the optical path of the second optical system 34B and enters the optical disk 42. Similarly, the light beam reflected by the optical disk 42 passes through the optical path of the second optical system 34B and enters the second PDIC 33B.

That is to say, since the optical path of the first optical system 34A is different from the optical path of the second optical system 34B, the number of parts of the optical systems disposed inside the optical pickup apparatus 31 becomes larger. This causes a problem that a longer time is required for attaching the parts or adjusting optical axes. Specifically, the light beam emitted from the first light source 32A is reflected by a reflection surface of the reflecting mirror 37 on the left side of the sheet surface and, then, enters the first wavelength plate 38A. On the other hand, the light beam emitted from the second light source 32B is reflected by a reflection surface of the reflecting mirror 37 on the right side of the sheet surface and, then, enters the second wavelength plate 38B. As a result, since the optical paths of the first and second optical systems 34A and 34B to the reflecting mirror 37 are different from each other, each of the optical paths requires the attachment operation of the parts of the optical system and adjustment of the optical axes. Similarly, since the first and second wavelength plates 38A and 38B are separately disposed, attachment operation and adjustments of optical axes are required.

Also, since the optical systems 34A and 34B have different optical paths, parts of the optical systems are required for each of the optical systems 34A and 34B. Moreover, space for the optical paths has to be secured. This causes a problem that it is difficult to reduce the optical pickup apparatus 31 in size.

As described above, in an optical pickup apparatus in which reflecting mirrors are disposed directly under each of an objective lens for BD and an objective lens for DVD and CD, optical paths are shared, so that for example, a light beam for BD is transmitted through the reflecting mirror for DVD and CD, is reflected by the reflecting mirror for BD, and then enters the objective lens for BD. In addition, a reflection film is formed on the reflecting mirror for DVD and CD. The reflection film has a phase characteristic having a wavelength dependency with respect to the light beam for BD. With this structure, the light beam for BD generates a phase difference after transmitted through the reflecting mirror for DVD and CD. Thus, there is a problem that the light beam for BD is irradiated onto the optical disk in the form of an elliptically polarized light. Essentially, it is designed that the light beam is polarized to a circularly polarized light by the quarter wavelength plate and is irradiated onto the optical disk in the form of the circularly polarized light. Note that if the objective lens for BD and the objective lens for DVD and CD are disposed in reverse positions, the light beam for DVD and CD is transmitted through the reflecting mirror for BD. Thus, there is caused a problem that the light beams for DVD and CD similarly generate a phase difference and the light beam to be irradiated onto the optical disk becomes an elliptically polarized light.

SUMMARY OF THE INVENTION

The present invention has been made in view of the foregoing problem. Accordingly, an object of the invention is to provide an optical pickup apparatus including a first emitting element configured to emit a first laser beam having a first wavelength; a second emitting element configured to emit a second laser beam having a second wavelength different from the first wavelength; a first objective lens guiding the first laser beam to and from a first optical information recording medium; a second objective lens guiding the second laser beam to and from a second optical information recording medium; a first reflecting mirror directly sending the first laser beam to and receiving the first laser beam from the first objective lens; a second reflecting mirror directly sending the second layer beam to and receiving the second laser beam from the second objective lens; and a reflection film disposed on the first reflecting mirror, in which the second reflecting mirror is configured to transmit the first laser beam so that the first laser beam is reflected by the first reflecting mirror and configured to reflect the second laser beam, and the reflection film is configured to cancel a phase difference generated in the first laser beam when the first laser beam is transmitted through the second reflecting mirror.

DESCRIPTION OF THE INVENTION

Figure 1:
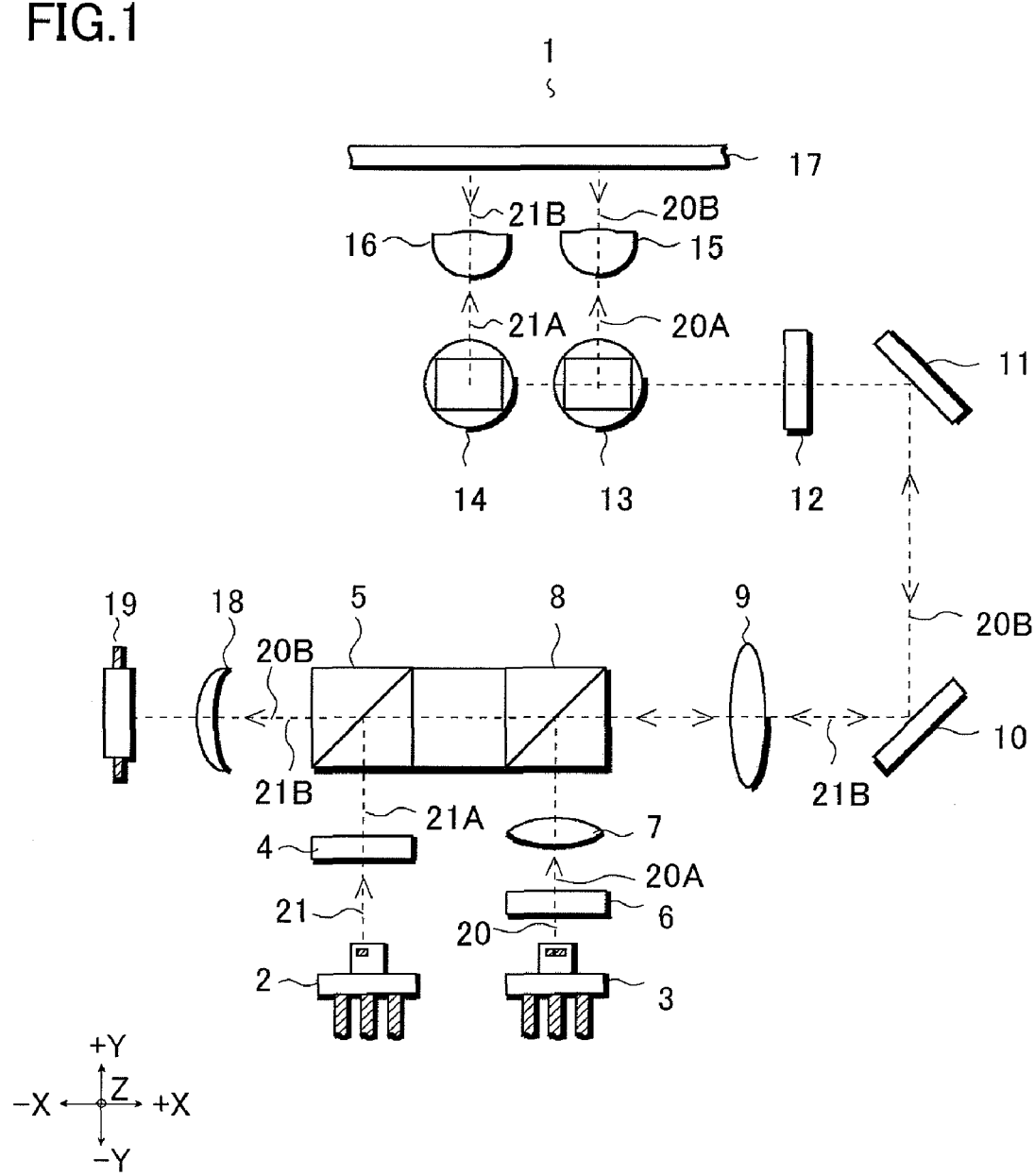
FIG. 1 is a schematic diagram illustrating an optical system of an optical pickup apparatus according to an embodiment of the invention.
Figure 2:
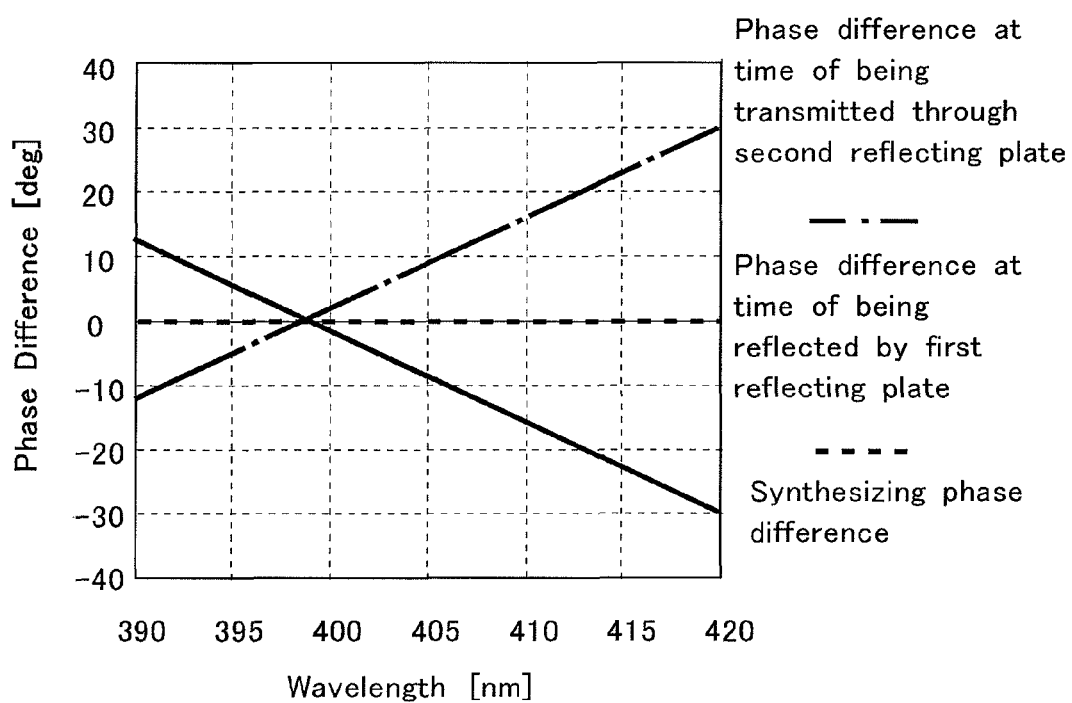
FIG. 2 is a graph illustrating phase difference characteristics of laser beams which are used in the optical pickup apparatus according to the embodiment of the invention.
Figures 3A, 3B:
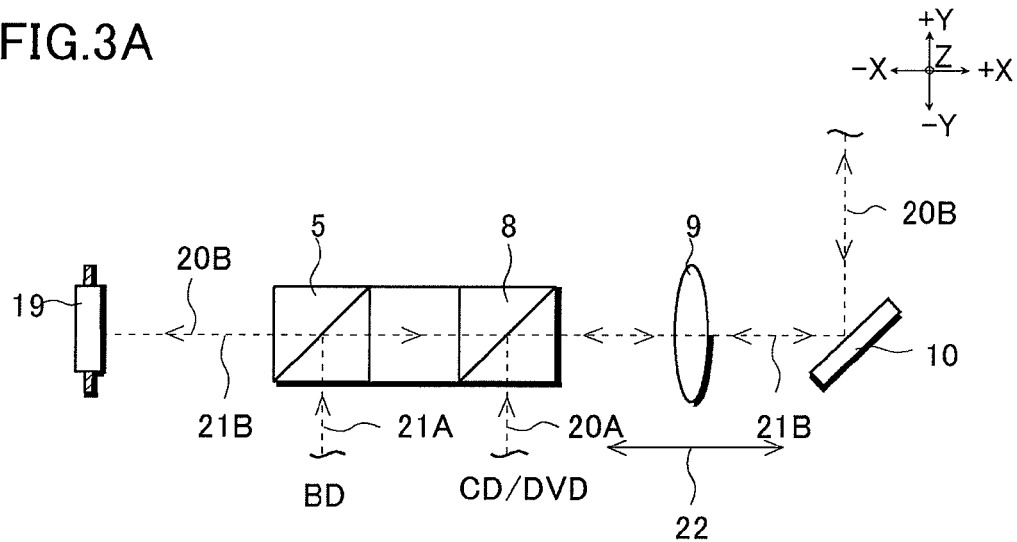
FIG. 3A is a schematic diagram illustrating an optical system of the optical pickup apparatus according to the embodiment of the invention.
FIG. 3B is a table illustrating characteristics of a reflection film which is used in the optical pickup apparatus according to the embodiment of the invention.
Figure 4A:
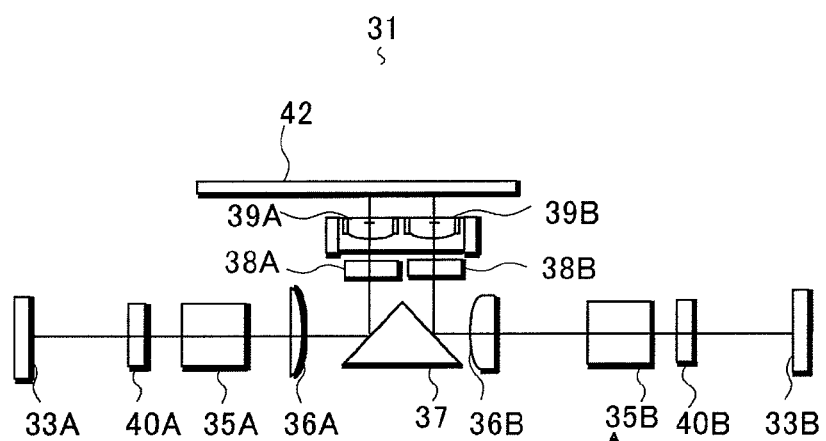
FIGS. 4A and 4B are schematic diagrams illustrating an optical system of an optical pickup apparatus according to a conventional embodiment.
Figure 4B:
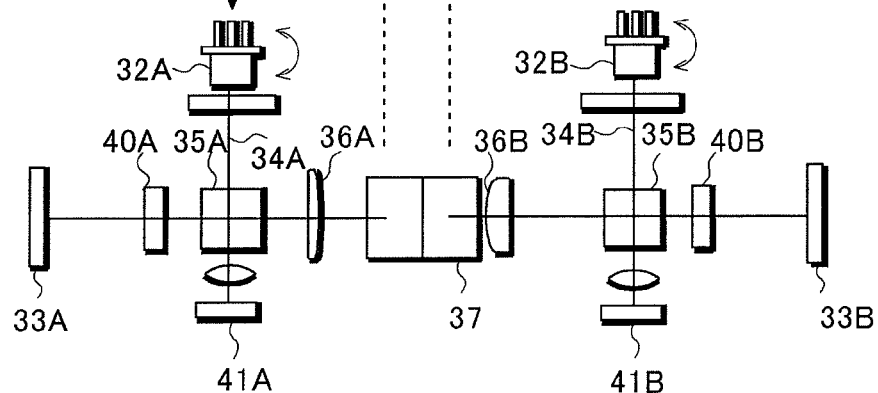

Hereinafter, an optical pickup apparatus according to a preferred embodiment of the invention is described. FIG. 1 is a schematic diagram illustrating an optical system of an optical pickup apparatus. FIG. 2 is a graph illustrating phase difference characteristics of laser beams which are used in the optical pickup apparatus. FIG. 3A is a schematic diagram illustrating arrangement of parts of the optical systems in the optical pickup apparatus. FIG. 3B is a table illustrating characteristics of a reflection film which is used in the optical pickup apparatus.

As shown in FIG. 1, an optical pickup apparatus 1 includes functions to focus laser beams of a BD (Blu-ray Disc) standard, a DVD (Digital Versatile Disk) standard, or a CD (Compact Disk) standard onto an information recording layer of an optical disk (an optical information recording medium), to receive the light reflected from the information recording layer, and to convert the received light to electric signals.

A first semiconductor laser device 2 emits a laser beam with a BD-standard wavelength (a blue-violet (blue) wavelength range of 400 nm to 420 nm (e.g., 405 nm)). A second semiconductor laser device 3 emits a laser beam with a DVD-standard wavelength (a red wavelength range of 645 nm to 675 nm (e.g., 655 nm)) and a laser beam with a CD-standard wavelength (an infrared wavelength range of 765 nm to 805 nm (e.g., 785 nm)). Note that the first and second semiconductor laser devices 2 and 3 may be a CAN-type package or a lead-frame-type package.

A first diffraction grating 4 is disposed between the first semiconductor laser device 2 and a first optical path synthesizing prism 5 to receive the laser beam of the BD standard. The first diffraction grating 4 includes a diffraction grating configured to decompose the entering laser beam into a 0-th order light, a +1 order diffracted light, and a −1 order diffracted light, and a half wavelength plate configured to convert the entering laser beam to a linearly polarized light in the S direction with respect to a polarization surface of the first optical path synthesizing prism 5. Similarly, a second diffraction grating 6 is disposed between the second semiconductor laser device 3 and a second optical path synthesizing prism 8 and includes a diffraction grating and a half wavelength plate. Note that the second diffraction grating 6 converts the entering light beams of the DVD standard and the CD standard to linearly polarized light in the S direction with respect to the polarization surface of the second optical path synthesizing prism 8.

A divergent lens 7 is disposed between the second diffraction grating 6 and the second optical path synthesizing prism 8 and is configured to adjust an angle of divergence of the laser beam diffracted by the second diffraction grating 6.

The first optical path synthesizing prism 5 has a built-in polarization surface having a wavelength selectivity and a polarization selectivity, and functions as a polarization beam splitter for the laser beam of the BD standard and functions as a total transmitting prism for the laser beams of the DVD standard and the CD standard. Specifically, for example, a reflection film to be described later is formed on the polarization surface, so that the laser beam of the BD standard, which is a linearly polarized light in the S direction, is reflected by the polarization surface in the +X direction indicated on the sheet. On the other hand, the laser beam of the BD standard, which is reflected by an optical disk 17 (optical feedback), passes through a quarter wavelength plate 12 to be a linearly polarized light in the P direction, thereby being transmitted through the polarization surface in the −X direction indicated on the sheet. Note that the laser beams of the DVD standard and the CD standard which enter the first optical path synthesizing prism 5 are totally transmitted through this reflection film in the ±X directions on the sheet.

The second optical path synthesizing prism 8 has a built-in polarization surface having a wavelength selectivity and a polarization selectivity, and functions as a polarization beam splitter for the laser beams of the DVD standard and the CD standard and functions as a total transmitting prism for the laser beam of the BD standard. Specifically, for example, a reflection film to be described later is formed on the polarization surface, so that the laser beams of the DVD standard and the CD standard, which are a linearly polarized light in the S direction, are reflected by the polarization surface by a desired percentage in the +X direction indicated on the sheet. On the other hand, the laser beams of the DVD standard and the CD standard, which are reflected by the optical disk (optical feedback), pass through the quarter wavelength plate 12 to be a linearly polarized light in the P direction, thereby being transmitted through the polarization surface by a desired percentage in the −X direction indicated on the sheet. Note that the laser beam of the BD standard which enters the second optical path prism 8 totally is transmitted through this polarization surface in the ±X directions indicated on the sheet.

A collimate lens 9 converts the laser beams of the BD standard, the DVD standard, and the CD standard into parallel beams. As shown in the drawings, the optical pickup apparatus 1 supports three-types of laser beams by using one collimate lens 9. The collimate lens 9 moves in a direction (the ±X directions indicated on the sheet) parallel to the optical path (optical axis) shown by a dashed line. Then, the collimate lens 9 optimizes an optical magnification according to a laser beam of the standard of each medium, so that interlayer stray light or interlayer crosstalk is suppressed to be caused.

A first reflection mirror 10 has a wavelength selectivity and a polarization selectivity, and a reflection film to be described later is foamed on the first reflection mirror 10, for example. Then, the laser beams of the DVD standard and the CD standard, which are reflected by the optical disk 17 (optical feedback), are reflected in the −X direction indicated on the sheet by a desired percentage according to the characteristic of the reflection film, and are transmitted in the −Y direction indicated on the sheet. Note that the laser beam of the BD standard is totally reflected in the Y direction or the −X direction indicated on the sheet.

A second reflection mirror 11 totally reflects the laser beams of the BD standard, the DVD standard, and the CD standard in the −X direction indicated on the sheet. On the other hand, the laser beams reflected by the optical disk 17 (optical feedback) are also totally reflected in the −Y direction indicated on the sheet.

Hereinafter, the description is given of the case where the second optical path synthesizing prism 8 and the first reflection mirror 10 adjust a reflectivity of the laser beams of the DVD standard and the CD standard to adjust the quantity of light of the laser beam to be guided to a PDIC 19. However, the embodiment is not limited to this case. For example, it is also possible that by reversely using the rolls of the first and second reflection mirrors 10 and 11, the second optical path synthesizing prism 8 and the second reflection mirror 11 adjust the reflectivity of the laser beams of the DVD standard and the CD standard to adjust the quantity of light to be guided to the PDIC 19.

The quarter wavelength plate 12 causes a phase difference in the entering laser beam. Thus, the laser beams of the BD standard, the DVD standard, and the CD standard are converted from the linearly polarized light in the S direction to a circularly polarized light. On the other hand, the laser beams reflected by the optical disk (optical feedback) are converted to linearly polarized light in the P direction after passing through the quarter wavelength plate 12 again.

A second reflecting mirror 13 includes a reflection surface having a wavelength selectivity and reflects the laser beams of the DVD standard and the CD standard in the +Y direction indicated on the sheet, and the laser beam of the BD standard is transmitted through the second reflecting mirror 13 in the −X direction indicated on the sheet. On the other hand, a first reflecting mirror 14 reflects the laser beam of the BD standard, which has been transmitted through the second reflecting mirror 13, in the +Y direction indicated on the sheet.

A second objective lens 15 focuses the laser beams of the DVD standard and the CD standard, which is reflected by the second reflecting mirror 13, onto the information recording layer of the optical disk 17. Similarly, a first objective lens 16 focuses the laser beam of the BD standard, which is reflected by the first reflecting mirror 14, onto the information recording layer of the optical disk 17. Note that the first reflecting mirror 14 is disposed directly under the first objective lens 16 and the second reflecting mirror 13 is disposed directly under the second objective lens 15.

An astigmatism generating element 18, for example, an anamorphic lens, is disposed between the first optical path synthesizing prism 5 and the PDIC 19. The three-types of laser beams reflected by the optical disk 17 (optical feedback) pass through the astigmatism generating element 18. Then, the astigmatism generating element 18 gives an aberration for focus servo to the passing laser beams. Accordingly, the one PDIC 19 can process the three-types of laser beams having different wavelengths.

The PDIC 19 functions as a light detector having a built-in photodiode integrated circuit element for detecting a signal, and receives the laser beam of the BD standard, the DVD standard, or the CD standard in a same light-receiving region on the same plane and outputs a detection signal containing an information signal component through photoelectric conversion. Furthermore, the PDIC 19 outputs a detection signal containing a servo signal component which is used for focus servo and tracking servo.

The optical path 20 of the laser beams of the DVD standard and the CD standard is described below.

The laser beam emitted from the second semiconductor laser device 3 is converted to a linearly polarized light in the S direction by the second diffraction grating 6 and is adjusted to a desired angle of divergence by divergent lens 7 and thereafter enters the second optical path synthesizing prism 8. Then, the laser beam is reflected by a desired quantity of light by a polarization surface of the second optical path synthesizing prism 8 and is converted to a parallel light in the collimate lens 9, and thereafter is totally reflected by the first reflection mirror 10.

Thereafter, the laser beam is totally reflected by the second reflection mirror 11 to pass through the quarter wavelength plate 12, to be converted from the linearly polarized light in the S direction to a circularly polarized light. After that, the circularly polarized laser beam is reflected by the second reflecting mirror 13 and thereafter is focused onto the information recording layer of the optical disk 17 by the second objective lens 15. Note that this optical path serves the role as an outgoing path 20A for the laser beams of the DVD standard and the CD standard.

The laser beam reflected by the information recording layer of the optical disk 17 (optical feedback) is transmitted through the second objective lens 15, is reflected by the second reflecting mirror 13, and thereafter is transmitted through the quarter wavelength plate 12. Accordingly, the laser beam is converted from the circularly polarized light to the linearly polarized light in the P direction. After that, the laser beam is reflected by the first and second reflection mirrors 10 and 11, and thereafter is transmitted through the collimate lens 9, the second optical path synthesizing prism 8, and the first optical path synthesizing prism 5. Then, the astigmatism generating element 18 gives an aberration to the laser beam. The laser beam then enters the PDIC 19, is received by a light-receiving region of the PDIC 19, and is thus converted into a detection signal through photoelectric conversion. Note that this optical path serves the roll as an incoming path 20B for the laser beams of the DVD standard and the CD standard. The reflectivity of the laser beams of the DVD standard and the CD standard is adjusted by the second optical path synthesizing prism 8 and the first reflection mirror 10 to adjust the quantity of light of the laser beams of the DVD standard and the CD standard, which enter the PDIC 19.

Hereinafter, an optical path 21 of the laser beam of the BD standard is described.

The laser beam emitted from the first semiconductor laser device 2 is converted to a linearly polarized light in the S direction by the first diffraction grating 4 and then enters the first optical path synthesizing prism 5. After that, the laser beam is totally reflected by the polarization surface of the first optical path synthesizing prism 5 and, thereafter, is totally transmitted through the second optical path synthesizing prism 8. Then, the laser beam is converted to a parallel light by the collimate lens 9, is totally reflected by the first and second reflection mirrors 10 and 11, and thereafter passes through the quarter wavelength plate 12. Accordingly, the laser beam is converted from the linearly polarized light in the S direction to a circularly polarized light. The laser beam of the circularly polarized light is transmitted through the second reflecting mirror 13, is reflected by the first reflecting mirror 14, and thereafter is focused onto the information recording layer of the optical disk 17 by the first objective lens 16. Note that this optical path serves as an outgoing path 21A of the laser beam of the BD standard.

The laser beam reflected by the information recording layer of the optical disk 17 (optical feedback) is transmitted through the first objective lens 16, is transmitted through the second reflecting mirror 13 and the quarter wavelength plate 12, and is then reflected by the first reflecting mirror 14. Accordingly, the laser beam is converted from the circularly polarized light to the linearly polarized light in the P direction. Then, after being totally reflected by the first and second reflection mirrors 10 and 11, the laser beam is sequentially transmitted through the collimate lens 9, the second optical path synthesizing prism 8, and the first optical path synthesizing prism 5. Thereafter, the laser beam is given of an aberration by the astigmatism generating element 18 and enters the PDIC 19 and is received by the light-receiving region of the PDIC 19, so that a detection signal is output through photoelectric conversion. Note that this optical path serves as an incoming path 21B of the laser beam of the BD standard.

As described above, the laser beam of the BD standard is firstly totally reflected by the polarization surface of the first optical path synthesizing prism 5 on the outgoing path 21A of the optical path 21, and, thereafter, travels on the optical path which is shared with the outgoing path 20A of the optical path 20. Then, the laser beam of the BD standard is transmitted through the second reflecting mirror 13 disposed on the optical path 21 because the optical path is shared.

In FIG. 2, a solid line shows a phase difference which is given to the laser beam of the BD standard when the laser beam of the BD standard is transmitted through the second reflecting mirror 13. The alternate long and short dash line shows a phase difference which is given to the laser beam of the BD standard when the laser beam of the BD standard is reflected by the first reflecting mirror 14. The dotted line shows a synthesized phase difference which is added when the laser beam of the BD standard passes through the first and second reflecting mirrors 13 and 14. As shown in FIG. 2, when the laser beam of the BD standard is transmitted through the second reflecting mirror 13, the laser beam (405 nm) of the BD standard is given of a phase difference of about −9 degrees. On the other hand, when the laser beam of the BD standard is reflected by the first reflecting mirror 14, the laser beam (405 nm) of the BD standard is given of a phase difference of about +9 degrees. In other words, as shown by the dotted line, a reflection film to cancel the phase difference which is generated when the laser beam of the BD standard is transmitted through the second reflecting mirror 13 is formed on the reflection surface of the first reflecting mirror 14, so that the optical paths 20 and 21 can be shared and a phase difference is prevented from being generated.

The collimate lens 9, the first and second reflection mirrors 10 and 11, the quarter wavelength plate 12, the astigmatism generating element 18, the PDIC 19 are used as shared parts of the optical paths 20 and 21. The reflection film having a wavelength selectivity is used in the first and second optical path synthesizing prisms 5 and 8, and the second reflecting mirror 13 to properly adjust the optical path between the laser beams of the DVD standard and the CD standard and the laser beam of the BD standard. In other words, in the optical pickup apparatus 1, it is achieved by sharing the parts of the optical systems and the reflection film characteristic that a major part of the optical paths 20 and 21 is shared.

With this structure, the number of the parts of the optical systems which are disposed inside the optical pickup apparatus 1 is reduced and attachment operation of the parts becomes easier. Also, a time required for adjusting the optical axis and the like is reduced. Accordingly, reduction of the cost can be achieved. Furthermore, the optical path 20 of the laser beams of the DVD standard and the CD standard and the optical path 21 of the laser beam of the BD standard are partially shared, so that the miniaturization of the optical pickup apparatus 1 can be achieved.

As shown in FIG. 3A, the optical path 20 of the laser beams of the DVD standard and the CD standard and the optical path 21 of the laser beam of the BD standard are shared, so that the second optical path synthesizing prism 8 is disposed on the optical path 21 of the laser beam of the BD standard. Therefore, the laser beam of the BD standard is transmitted through the polarization surface of the second optical path synthesizing prism 8 even in the outgoing path 21A and an incoming path 21B. For this reason, the characteristic of the reflection film which is used for the second optical path synthesizing prism 8 is determined based on a desired reflectivity and transmittivity with respect to the laser beams of the DVD standard and the CD standard and is also determined so that the laser beam of the BD standard totally is transmitted through the reflection film.

On the other hand, in particular, the laser beams of the DVD standard and the CD standard are easily affected in the optical disk 17, and there is a case where the laser beams of the DVD standard and the CD standard do not become a laser beam of a linearly polarized light in the P direction on the incoming path 20B due to a birefringence of the optical disk 17 with bad quality, but becomes a laser beam of an elliptically polarized light containing a linearly polarized light component in the S direction. Then, even when the laser beam reflected from the optical disk 17 becomes a laser beam of a linearly polarized light in the S direction, it is necessary that the laser beam is received by the PDIC 19 and a detection signal is outputted.

In this regard, as shown in FIG. 3B, a reflection film having a wavelength selectivity and a polarized selectively is formed on each of the first and second optical path synthesizing prisms 5 and 8, and the first reflection mirror 10. Specifically, formed on the first optical path synthesizing prism 5 is a reflection film which totally transmits the laser beams of the DVD standard and the CD standard and totally reflects the linearly polarized light in the S direction of the laser beam of the BD standard while transmitting the linearly polarized light in the P direction of the laser beam of the BD standard.

Also, formed on the second optical path synthesizing prism 8 is a reflection film which totally transmits the laser beam of the BD standard, and reflects 90% of the linearly polarized light in the S direction of the laser beams of the DVD standard and the CD standard while transmitting 60% of the linearly polarized light in the P direction of the laser beams of the DVD standard and the CD standard. Here, as described above, if the optical disk 17 has a bad quality and the laser beam of the linearly polarized light in the S direction returns on the incoming path 20B, 10% of the laser beams is transmitted through the second optical path synthesizing prism 8. This causes a problem that a large difference is generated relative to the quantity of transmitted light in the case of the linearly polarized light in the P direction.

In this regard, formed on the first reflection mirror 10 is a reflection film which totally reflects the laser beam of the BD standard, and reflects 100% of the linearly polarized light in the S direction of the laser beams of the DVD standard and the CD standard while reflecting 30% of the linearly polarized light in the P direction of the laser beams of the DVD standard and the CD standard. If the laser beams of the DVD standard and the CD standard of the linearly polarized light in the P direction return on the incoming path 20B, 30% of the laser beam is reflected by the first reflection mirror 10 and 60% of the laser beam is transmitted through the second optical path synthesizing prism 8, and, thus, 18% of the linearly polarized light in the P direction is transmitted through the second optical path synthesizing prism 8. As a result, with regard to the laser beams of the DVD standard and the CD standard, the reflectivity (18%) of the linearly polarized light in the P direction and the reflectivity (10%) of the linearly polarized light in the S direction approximate to each other on the incoming path 20B. If the PDIC 19 receives the laser beam of the linearly polarized light in the P direction, or even if the PDIC 19 receives the laser beam of the linearly polarized light in the S direction, there is no big difference in the quantities of light thereof, thereby being capable of correctly outputting a detecting signal as a light detector.

Furthermore, since the first optical path synthesizing prism 5 is disposed to be closer to the PDIC 19 side than the second optical path synthesizing prism 8, a length of the optical path of the laser beam of the BD standard becomes longer than a length of the optical path of the laser beams of the DVD standard and the CD standard. For example, if the first and second optical path synthesizing prisms 5 and 8 are integrally formed, the longitudinal direction of the integrated prisms is disposed along the optical paths 20 and 21 shown by the dotted line, so that the relationship in the lengths of the optical paths can be achieved. The laser beam of the BD standard has a shorter wavelength as compared with the wavelength of the laser beams of the DVD standard and the CD standard. Also, the structure of an optical disk of the BD standard is different from the structure of optical disks of the DVD standard and the CD standard. Thus, the laser beam of the BD standard is easily affected by an aberration as compared with the laser beams of the DVD standard and the CD standard. Accordingly, as shown by the arrowed line 22, it becomes important that the collimate lens 9 secures a distance to travel in a parallel direction (the ±X directions indicated on the sheet) with respect to the optical path (optical axis) shown by the dotted line. In other words, the length of the optical path of the laser beam of the BD standard is secured by using the arrangement of the first and second optical path synthesizing prisms 5 and 8. Accordingly, the miniaturization of the device size and an optical pickup apparatus supporting three wavelengths can be achieved.

Note that in the embodiment, the description is given of the case where design conditions such as an incident angle of a laser beam, a quality, material, and thickness of a reflection film, and the like are taken into consideration, and a reflectivity of a laser beam is adjusted by a reflection film which is formed on the second optical path synthesizing prism 8 and the first reflection mirror 10 to adjust a quantity of light to be guided to the PDIC 19. However, the embodiment is not limited to this case. For example, such case can be thought that the transmittivity of the linearly polarized light in the P direction of the laser beams of the DVD standard and the CD standard is caused to be proximate to the transmittivity of the linearly polarized light in the S direction only by the reflection film which is formed on the polarization surface of the second optical path synthesizing prism 8 to adjust the quantity of light received in the PDIC 19. Also, with regard to the characteristic of the reflection film shown in FIG. 3B, a numerical value thereof can be changed as needed according to the design conditions such as an incident angle of the laser beam, a quality, material, thickness of a reflection film, and the like.

Also, as shown in FIG. 3A, the description is given of the case where the first and second optical path prisms 5 and 8 are integrally formed. However, the embodiment is not limited to this case. For example, the first and second optical path synthesizing prisms 5 and 8 may be separated parts. Also, the first and second optical path synthesizing prisms 5 and 8 may be replaced by a reflection mirror on which the reflection film is formed. Moreover, various modifications can be made in a range without departing from the scope of the invention.

According to the invention, a phase difference which is given when the first laser beam is transmitted through the second reflecting mirror is cancelled at the first reflecting mirror to achieve that the first and second optical paths are shared. Thus, the number of parts of the optical systems is reduced, an attachment operation thereof becomes easier, and a time required for adjusting optical axes is also reduced.

In addition, according to the invention, it is achieved that the first and second optical paths are shared and the optical parts, such as a shared quarter wavelength plate, are shared. Accordingly, the number of the parts of the optical systems is reduced, so that reduction in the cost can be achieved.

Moreover, according to the invention, the polarization member is disposed on each of the first and second optical paths, so that a major part of the first and second optical paths can be shared and miniaturization of an optical pickup apparatus can be achieved.

Furthermore, according to the invention, a reflectivity and a transmittivity of the second laser beam are adjusted by the optical path synthesizing prism and the reflection mirror. Thus, it can be achieved that the first and second optical paths can be shared.

Also, according to the invention, a length of the optical path of a laser beam of the BD standard is set longer than a length of the optical path of laser beams of the DVD standard and the CD standard. Thus, an aberration of the laser beam of the BD standard is accurately adjusted.

What is claimed is:

1. An optical pickup apparatus comprising:
   a first emitting element configured to emit a first laser beam having a first wavelength;
   a second emitting element configured to emit a second laser beam having a second wavelength different from the first wavelength;
   a first objective lens guiding the first laser beam to and from a first optical information recording medium;
   a second objective lens guiding the second laser beam to and from a second optical information recording medium;
   a first reflecting mirror directly sending the first laser beam to and receiving the first laser beam from the first objective lens;
   a second reflecting mirror directly sending the second laser beam to and receiving the second laser beam from the second objective lens; and
   a reflection film disposed on the first reflecting mirror,
   wherein the second reflecting mirror is configured to transmit the first laser beam so that the first laser beam is reflected by the first reflecting mirror and configured to reflect the second laser beam, and
   the reflection film is configured to cancel a phase difference generated in the first laser beam when the first laser beam is transmitted through the second reflecting mirror.

2. The optical pickup apparatus of claim 1, further comprising a quarter wavelength plate disposed in an optical path shared by the first and second laser beams next to the second reflecting mirror.

3. The optical pickup apparatus of claim 2, further comprising a first polarization member and a second polarization member that are disposed in the shared optical path, wherein the first polarization member is configured to transmit a part of the first laser beam and to reflect another part of the first laser beam, and the second polarization member is configured not to reflect the first laser beam and configured to transmit a part of the second laser beam and to reflect another part of the second laser beam.

4. The optical pickup apparatus of claim 3, further comprising a light-receiving element disposed at one end of the shared optical path, wherein the quarter wavelength plate, the first and second polarization members and the light-receiving element are disposed in the shared optical path.

5. The optical pickup apparatus of claim 1, wherein the first laser beam comprises a laser beam of a BD standard and the second laser beam comprises a laser beam of a DVD or CD standard.

* * * * *